US006081718A

United States Patent [19]

Ando et al.

[11] Patent Number: 6,081,718

[45] Date of Patent: Jun. 27, 2000

[54] VEHICLE COMMUNICATION SYSTEM FOR TOLL COLLECTION

[75] Inventors: Toshihide Ando, Chita-gun; Taisei Katoh, Toyoake, both of Japan

[73] Assignee: Denso Corporation, Kariya, Japan

[21] Appl. No.: 08/915,321

[22] Filed: Aug. 20, 1997

[30] Foreign Application Priority Data

Aug. 22, 1996 [JP] Japan .................................... 8-221055

[51] Int. Cl.$^{7}$ ............................. H04B 7/26; G07B 15/00

[52] U.S. Cl. ........................... 455/447; 455/446; 340/928

[58] Field of Search ..................................... 340/928, 901, 340/825.54; 342/42; 455/446, 447, 260

[56] References Cited

U.S. PATENT DOCUMENTS

| | | | |
|---|---|---|---|
| 4,144,496 | 3/1979 | Cunningham et al. | 455/446 |
| 5,233,643 | 8/1993 | Naeini et al. | 455/456 |
| 5,266,785 | 11/1993 | Sugihara et al. | 235/384 |
| 5,485,520 | 1/1996 | Chaum et al. | 380/24 |
| 5,525,991 | 6/1996 | Nagura et al. | 342/42 |
| 5,552,920 | 9/1996 | Glynn | 455/13.3 |
| 5,554,984 | 9/1996 | Shigenaga et al. | 340/937 |
| 5,710,556 | 1/1998 | Nishimura et al. | 340/928 |
| 5,751,227 | 5/1998 | Yoshida et al. | 340/928 |
| 5,774,795 | 6/1998 | Ando | 455/106 |
| 5,850,191 | 12/1998 | Yagi et al. | 340/928 |
| 5,850,608 | 12/1998 | Faruque | 455/447 |
| 5,883,889 | 3/1999 | Faruque | 455/446 |

FOREIGN PATENT DOCUMENTS

| | | |
|---|---|---|
| 0585718 A1 | 3/1994 | European Pat. Off. . |
| 0609453 A1 | 8/1994 | European Pat. Off. . |
| 0693741 A2 | 1/1996 | European Pat. Off. . |
| 19548363 A1 | 6/1996 | Germany . |
| 19605665 A1 | 8/1996 | Germany . |
| 55-116176 | 6/1980 | Japan . |
| 4-303289 | 10/1992 | Japan . |
| 4-315282 | 11/1992 | Japan . |
| 5-314325 | 5/1993 | Japan . |
| 5-324967 | 12/1993 | Japan . |
| 6-131509 | 5/1994 | Japan . |

OTHER PUBLICATIONS

Patent Abstracts of Japan, vol. 96, No. 7, Jul. 1996, JP 8–079164 A, (NIPPONDENSO Co Ltd) Mar. 22, 1996.

*Primary Examiner*—Reinhard J. Eisenzopf
*Assistant Examiner*—Duc Nguyen
*Attorney, Agent, or Firm*—Pillsbury Madison & Sutro LLP

[57] ABSTRACT

To perform communication speedily and reliably at an increased frequency of communication occurrence when providing multiple antenna units which are set to the same frequency, each of antenna units having a gantry in a tollgate is set such that adjacent antenna units having the same frequency alternately perform communications. Each communication period is set to have a down link period in which an interrogation signal is transmitted and an up link period in which an unmodulated carrier wave is transmitted while a response signal is received. Upon receiving a signal, an on-vehicle device generates a response signal by using a control circuit and transmits the signal by reflection, and fixes a communication party for further communications. The communication cycles of adjacent antenna units are shifted from each other, thereby avoiding interference. The down link periods and the up link periods coincide between the antenna units whose communication areas are apart from each other, thereby avoiding interference.

7 Claims, 7 Drawing Sheets

FIG. 3
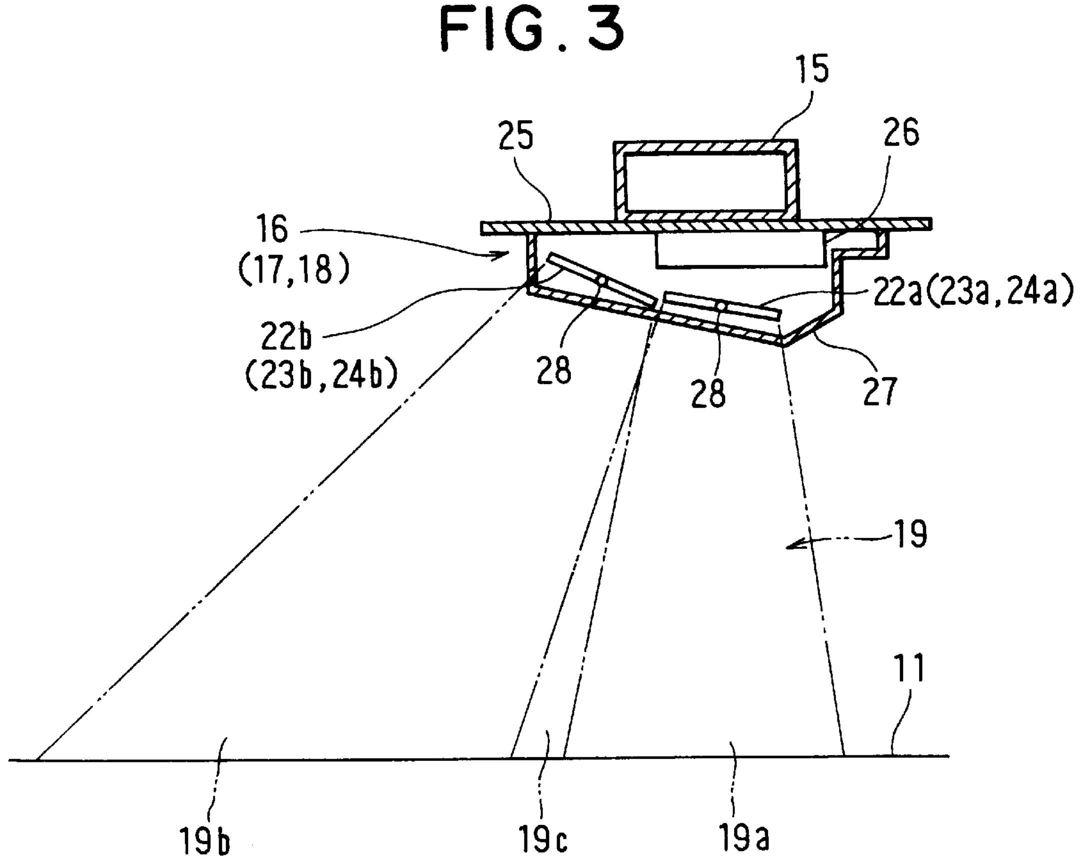
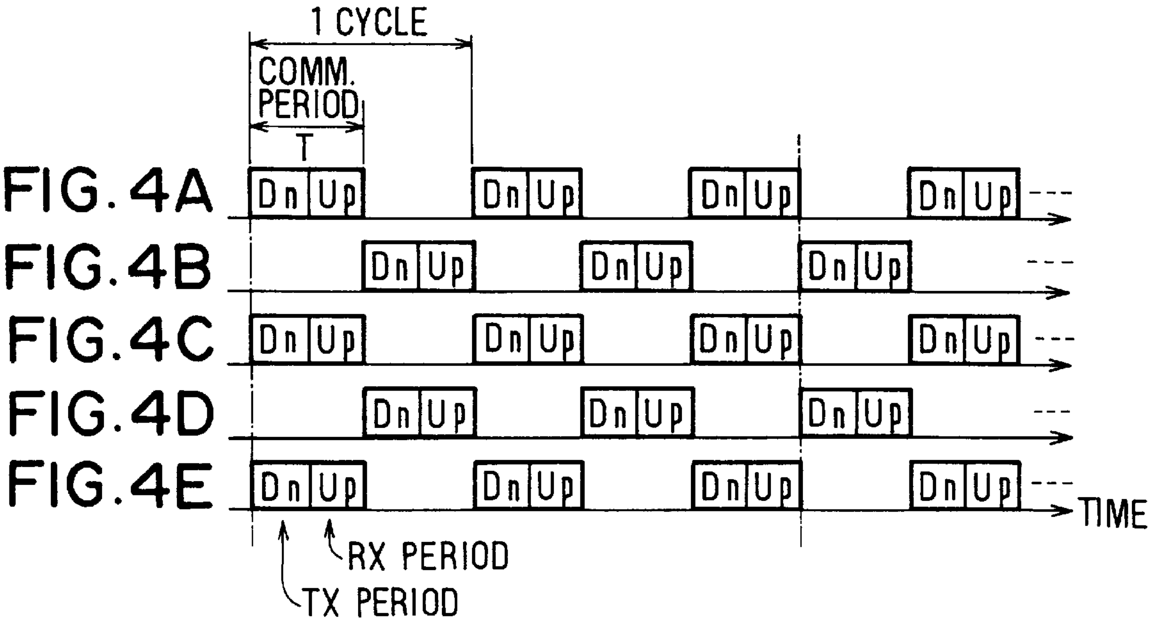

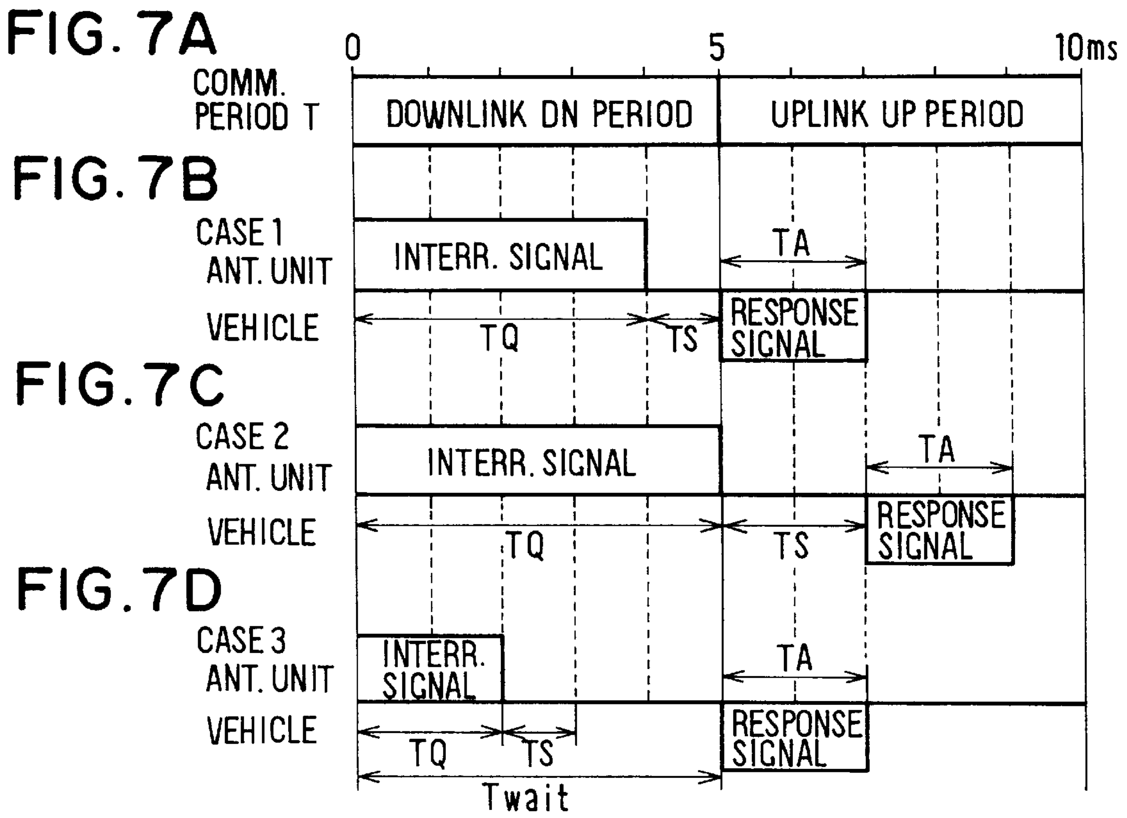
FIG. 7A
0
5
10ms
COMM. PERIOD T
DOWNLINK DN PERIOD
UPLINK UP PERIOD
FIG. 7B
CASE 1
ANT. UNIT
INTERR. SIGNAL
TA
VEHICLE
TQ
TS
RESPONSE SIGNAL
FIG. 7C
CASE 2
ANT. UNIT
INTERR. SIGNAL
TA
VEHICLE
TQ
TS
RESPONSE SIGNAL
FIG. 7D
CASE 3
ANT. UNIT
INTERR. SIGNAL
TA
VEHICLE
TQ
TS
RESPONSE SIGNAL
Twait
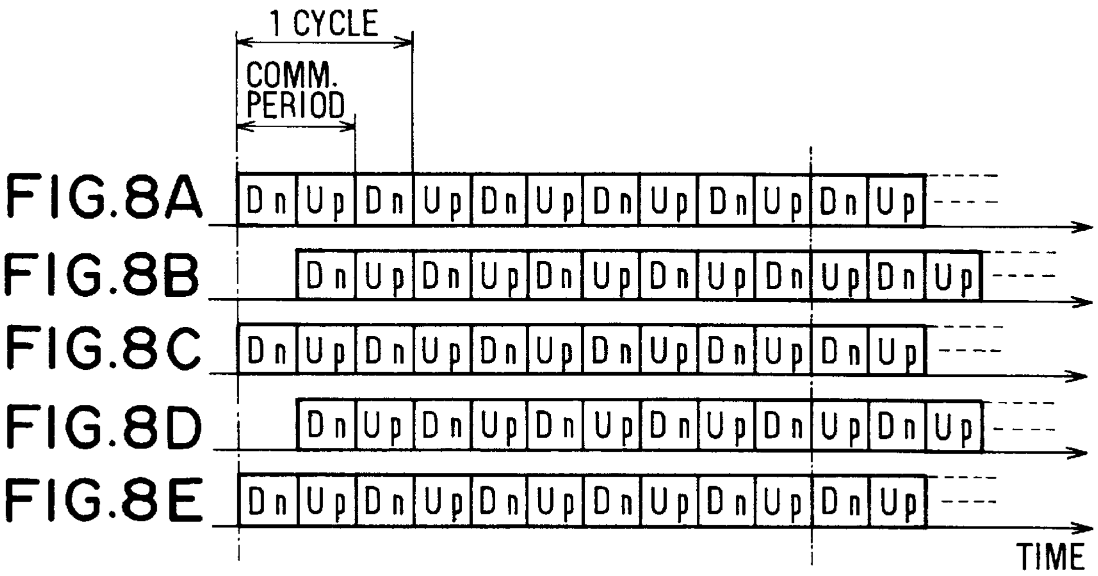
1 CYCLE
COMM. PERIOD
FIG. 8A
FIG. 8B
FIG. 8C
FIG. 8D
FIG. 8E
Dn
Up
TIME FIG. 9
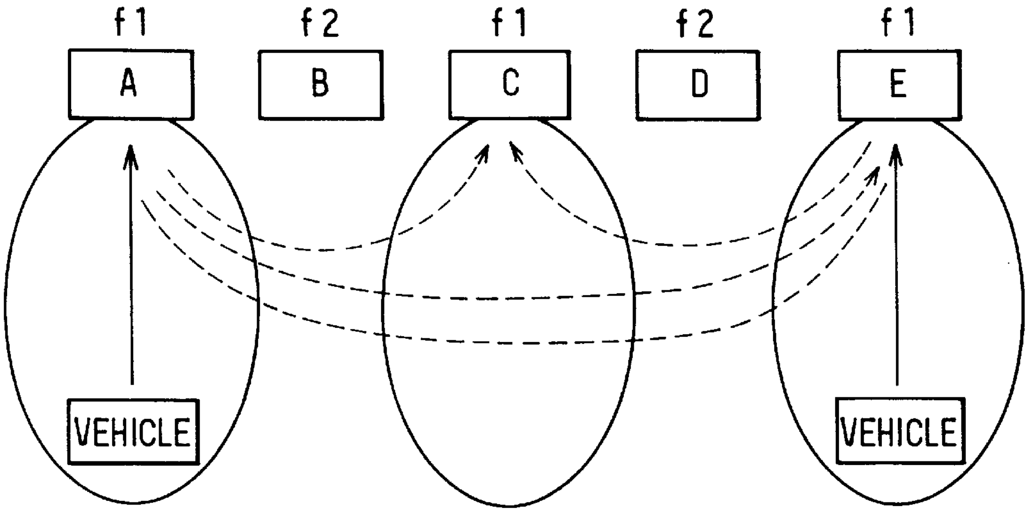
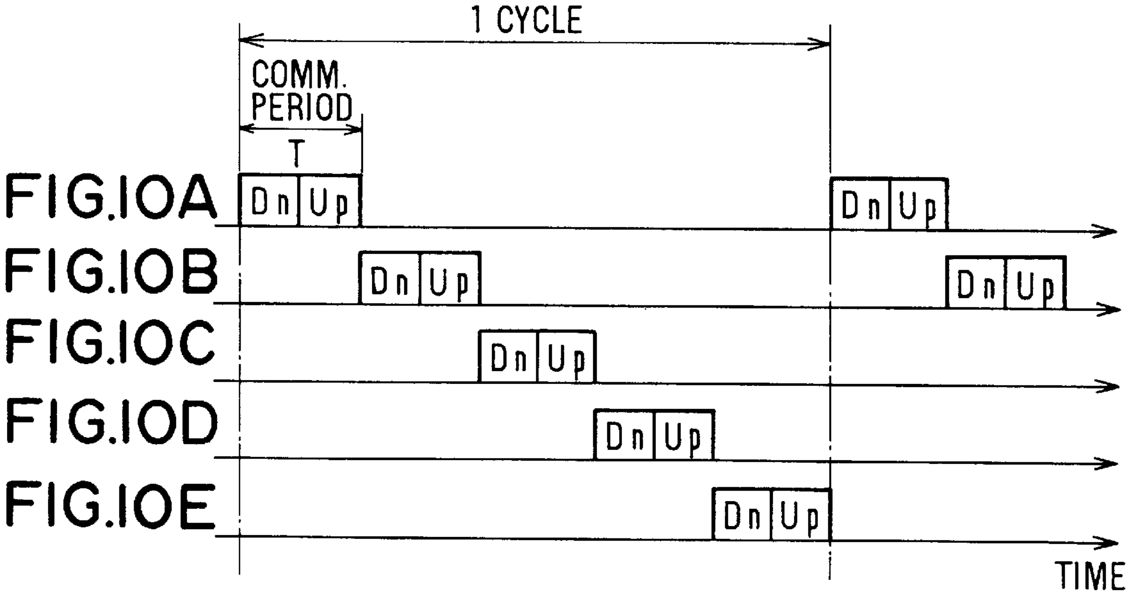
PRIOR ART

VEHICLE COMMUNICATION SYSTEM FOR TOLL COLLECTION

CROSS-REFERENCE TO RELATED APPLICATION

This application is related to Japanese Patent Application No. Hei 8-221055, incorporated herein by reference.

BACKGROUND OF THE INVENTION

1. Field of the Invention

The present invention relates to a vehicle communication system including a ground device having multiple antenna units for setting specified communication areas on a road, and an on-vehicle device mounted on a vehicle for communicating with the ground device when the vehicle passes through the communication area.

2. Description of Related Art

An automatic toll charging method for a toll road such as an expressway has been provided where a vehicle has an on-vehicle device which stores a pre-registered identification number or the like and is capable of transmitting it, and a ground device is installed at a place for toll charging on the road so that communication is performed between the ground device and the on-vehicle device when the vehicle passes through a communication area set by the ground device, and the ground device stores an indication that the vehicle having the registered identification number has passed through the area, thereby performing toll charging by other means based on the recorded data.

For example, such a system, i.e., an unmanned system for a toll road, is disclosed in Japanese Laid-open Patent Publication No. Sho 55-116176. The system has entrances and exits on the toll road provided with transmitting and receiving systems, and a vehicle also has a transmitting and receiving system so that communication is performed therebetween to exchange tolling data and perform automatic toll charging without stopping the vehicle. Automatic tolling systems are also disclosed in Japanese Laid-Open Patent Publication Nos. Hei 5-314325, Hei 4-303289, Hei 4-315282 and Hei 6-131509.

The above systems are designed for a single traffic lane and therefore have some difficulties in application to a typical load having multiple lanes where a wide communication area is set. A toll charging system adapted to a road having multiple lanes is disclosed in, for example, Japanese Laid-Open Patent Publication No. Hei 5-324967. This toll charging system using a non-contact IC card is designed to improve the reliability of radio communication between the ground device and the non-contact IC card at a check barrier, where multiple antennas are connected to the ground device and are arranged so that the communication areas of the antennas are shifted from each other in the vehicle traveling direction with respect to a single lane, thereby increasing the occasions in which communication is possible between the ground device and the non-contact IC card of the vehicle.

In a toll road such as an expressway or the like where toll charging is needed, this construction eliminates the need for performing the toll charging with the individual lanes being partitioned in the toll road if the road has multiple lanes, but performs the toll charging automatically for the multiple lanes, thereby reducing the manpower and the incidence of traffic congestion at toll gates.

The above-described conventional construction requires that antennas be arranged over a long distance, so it is necessary that the antennas can be arranged even in a narrow installation space. Accordingly, the following construction can be employed, where the antennas can be arranged over a reduced distance using a similar method.

In example constructions described in U.S. Pat. No. 5,525,991 and U.S. patent application Ser. No. 08/574,635, multiple antenna units form communication areas corresponding to individual lanes of a road and the communication area of each antenna unit overlaps with the adjacent communication area, thereby enabling the communication areas of the antenna units to cover the entire width of the road without any communication blind spots. In this case, different signal transmission timings are set to the antenna units which have an overlapping area therebetween, and the signal frequencies of the antenna units are set to different values within a range in which on-vehicle devices can receive the signals, thereby enabling reliable communications.

In the above-described construction, however, frequency division is performed so that the frequencies of the antenna units are set differently. The construction therefore has a problem in that, taking a frequency band per antenna unit into consideration, the number of antenna units which can be arranged is limited if an available frequency band is limited.

Japanese Laid-Open Patent Publication No. Hei 6-243385 discloses a construction where the same frequency is set to respective antenna units and communication periods are set using a time-division multiplex method. This eliminates interference between the antenna units so that communication processing can be reliably performed although there are multiple antenna units using the same frequency.

In the above-described construction, however, when five antenna units 1 to 5 are used as shown in FIGS. 10A–10E, each communication period of the antenna units 1–5 is sequentially shifted by a period assigned by time division so that the antenna units 2–5 stop communication while the antenna unit 1 is communicating with an on-vehicle device 6 as shown in FIG. 11. Accordingly, one cycle time required for communications of all antenna units becomes 5T with respect to one-time communication time T of the antenna unit 1.

When the antenna units are set to the same frequency, as a result, if the antenna unit 1 is communicating with the on-vehicle device 6 which exists in a communication area 1*a*, as shown in FIG. 12, a communication signal output from an antenna unit 3 is also received by the antenna unit 1 where a communication area 3*a* is not overlapped, so that interference occurs while the antenna unit 1 is receiving a communication signal from an on-vehicle device 6 which exists in its communication area 1*a*, and this may lead to disable communication. The time-division multiplex communication is therefore performed to avoid such problems.

The communication time per antenna unit is inversely proportional to the number of antenna units, and the number of antenna units which can be used is also limited when considering a substantial time required for communication processing and the frequency of communication occurrence for reliably accomplishing communications with a vehicle which passes through the communication area, thus leading to a problem in that it is impossible to provide a number of antenna units for covering wide communication areas.

SUMMARY OF THE INVENTION

The present invention is made in view of the above problems of the prior art and has an object of providing a vehicle communication system which can perform the communication processing speedily and reliably and prevent interference with other antenna units without shortening a communication time per antenna unit even if multiple antenna units are used in order to set wider communication areas.

The above object is achieved according to a first aspect of the present invention by providing that when the antenna units which are set to the same frequency transmit interrogation signals to the communication areas, each communication signal is output not only to its communication area but to other areas. This is because an area set as a communication represents the area where communications with the antenna unit is enabled when an on-vehicle device exists in the area.

If the antenna units do not have an overlapping communication area therebetween, therefore, and if another antenna unit transmits while an antenna unit is receiving, the antenna unit may not be able to receive a response signal from an on-vehicle device in its communication area if the antenna units are controlled with the same frequency.

To solve such problems, a communication control unit controls the antenna units which are set to the same frequency so that their transmissions and receptions are performed in the same period, thereby preventing interference and performing communication processing reliably and speedily at an increased frequency of communication occurrence.

Additionally, the above description will have obvious effects in a construction wherein a response signal of the on-vehicle device is transmitted after modulating an unmodulated carrier wave transmitted from an antenna unit. That is, if the antenna unit receives unmodulated carrier waves from other antenna units when multiple antenna units which are set to the same frequency perform the receptions in the same period as described above, this does not cause a failure in the reception of the antenna unit, thereby eliminating the intra-unit interference and performing reliable communication processing.

The higher the degree of agreement between the frequencies of carrier waves output from antenna units, the greater the likelihood of interference is avoided if the antenna unit receives unmodulated carrier waves as described above. If the agreement of frequency fluctuates, the unmodulated carrier waves output from other antenna units are received as a kind of modulated waves, thereby starting to cause interference.

The adjacent antenna units whose communication areas overlap with each other and which are set to the same frequency may perform the communication processing one after the other so that the communication periods do not overlap with each other, thereby enabling a construction wherein all antenna units are set to the same frequency. Thus, the simplified construction is usable in a narrow frequency band, thereby preventing interference among the antenna units and performing communication processing speedily and reliably.

The communication control unit may control the adjacent antenna units whose communication areas overlap with each other and which are set to the same frequency to perform the communication processing so that the communication periods thereof are shifted from each other by a half cycle. If the on-vehicle device communicates with the antenna unit in the overlapping communication area, therefore, the on-vehicle device can speedily and reliably communicate with either antenna unit without causing interference with both antenna units.

If a time period of transmitting an interrogation signal from the antenna unit is short, or if a time period until the on-vehicle device replies to the interrogation signal after receiving the signal is short and therefore the transmission of the on-vehicle device is initiated during the transmission period of the antenna unit, the communication control unit may adjust and set the interrogation signal beforehand so that the timing of starting the transmission is within the time period of the reception of the antenna unit, and the on-vehicle device may generate and transmit a signal in response to the interrogation signal, thereby automatically enabling the communication processing without interference.

The timing of transmitting a response signal is adjusted in the on-vehicle device so that the response signal can be received within the receiving time period of the antenna unit, thereby enabling the communication processing without interference.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a vertical cross-sectional view of a ground device according to the first embodiment;

FIGS. 4A–4E are timing charts showing communication periods of antenna units in the first embodiment;

FIGS. 7A–7D are timing charts showing operation of the first embodiment according to communication periods and time periods of respective signals;

FIGS. 8A–8E are timing charts corresponding to FIGS. 4A–4E showing the operation of a second preferred embodiment of the present invention;

FIG. 9 shows communication areas and communication states of the antenna units in the second embodiment;

FIGS. 10A–10E are timing charts showing the operation of a prior art system.

DETAILED DESCRIPTION OF THE PRESENTLY PREFERRED EXEMPLARY EMBODIMENTS

Figure 1:
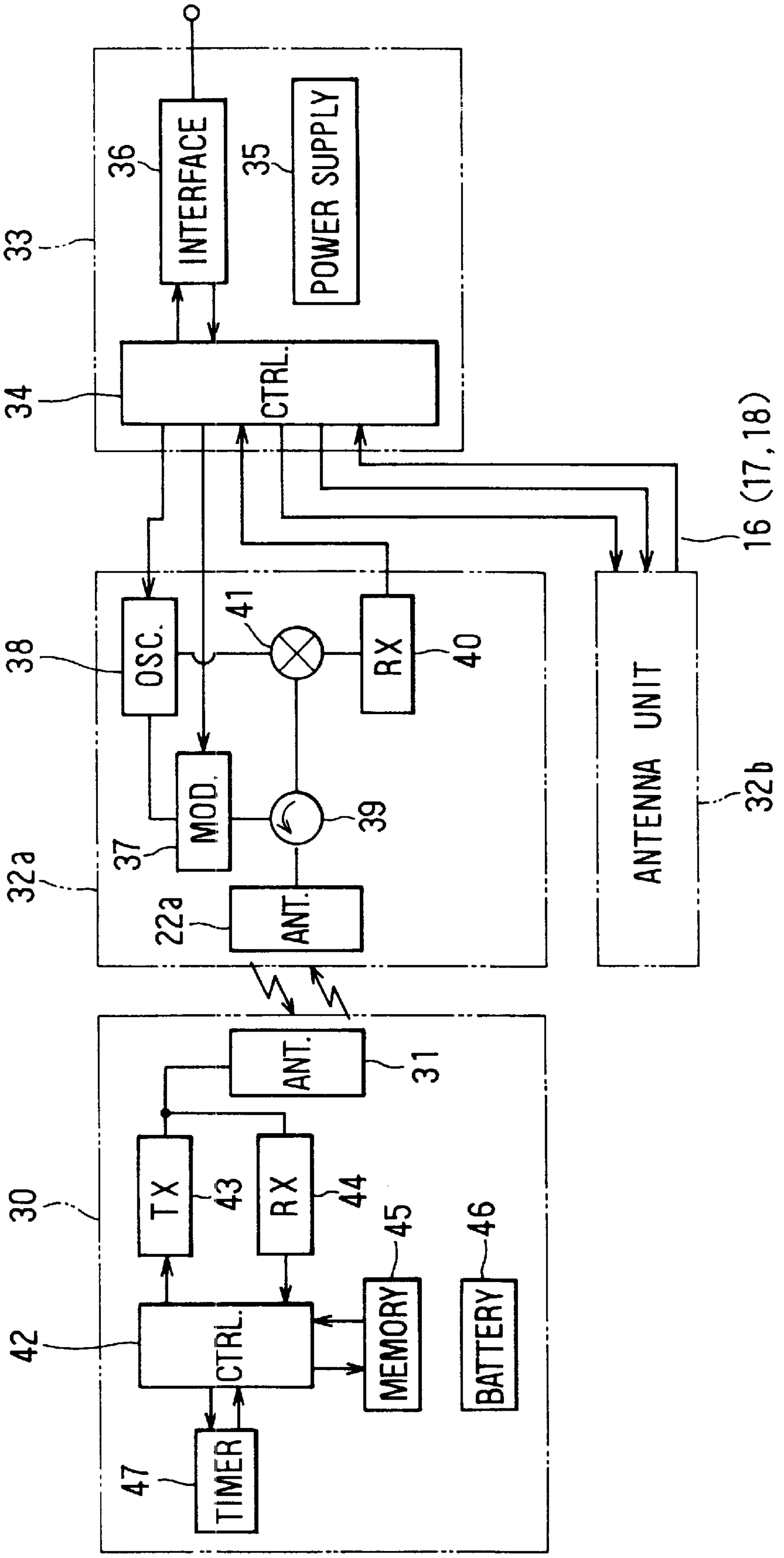
FIG. 1 is a block diagram of a first preferred embodiment of the present invention.
Figure 2:
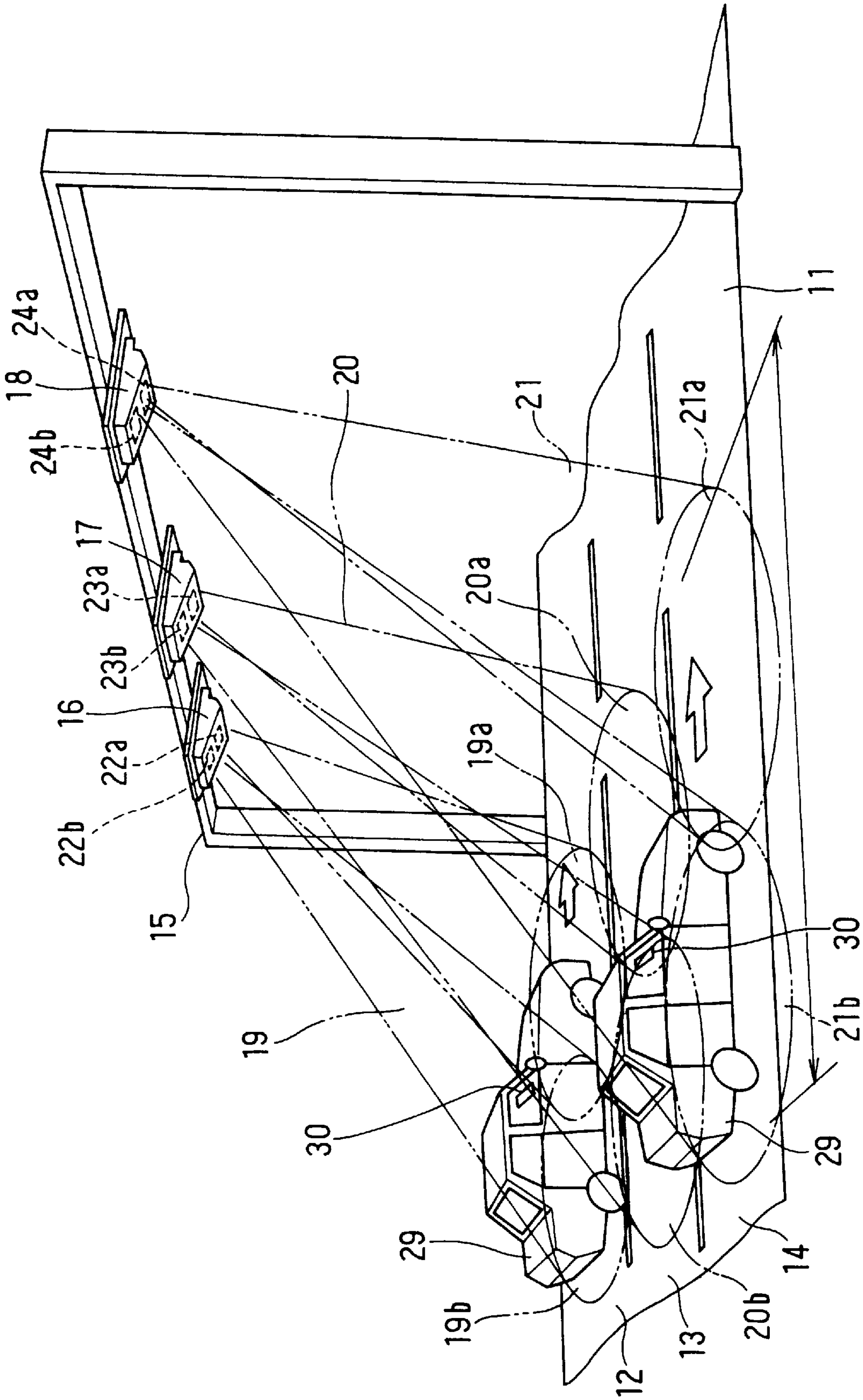
FIG. 2 is an overall perspective view of the first embodiment.

A first preferred embodiment in which the present invention is applied to a toll charging system for an expressway will be described hereinafter with reference to FIGS. 1–7D. In FIG. 2 showing an overall view of the first embodiment, an expressway 11 (only one direction of traffic flow of the expressway 11 is shown) has three lanes 12, 13 and 14 on one side. A predetermined toll charging point has a gantry 15 as a ground device extending over the road 11. The gantry 15 has antenna units 16–18 directed downward to corresponding ones of the lanes 12–14 to set communication areas 19–21.

The communication areas 19–21 are set in such a direction from the respective antenna units 16–18 that they cover approaching vehicles (represented by automobiles 29). In this embodiment, the antenna units 16–18 respectively have antenna elements 22*a* and 22*b*, 23*a* and 23*b*, and 24*a* and 24*b* that respectively set communicative areas 19*a* and 19*b*, 20*a* and 20*b*, and 21*a* and 21*b*, thereby respectively forming the communication areas 19–21.

As shown in FIG. 3 (the antenna unit 16 is shown as a representative structure which is similar to the other antenna units), each of the antenna units has a waterproof construction including a base 25 installed on the lower surface of the gantry 15, a control circuit section 26 mounted on the base 25, antenna elements 22*a* and 22*b*, and a resin cover 27 which is permeable to radio waves.

The control circuit section 26 controls the driving of the antenna elements 22*a* and 22*b* for transmitting and receiving. The antenna elements 22*a* and 22*b* are rotatably supported by support shafts 28 so that the orientation of the radiation surfaces of the antenna elements 22*a* and 22*b* can be adjusted. Although not shown in the Figure, the antenna elements 22*a* and 22*b* are also rotatably supported with respect to a direction perpendicular to the support shafts 28 by a well-known structure so that the orientation of the radiation surfaces can also be adjusted with respect to directions perpendicular to the support shafts 28.

The communicative areas 19*a* and 19*b* are set respectively depending on the angles of the radiation surfaces of the antenna elements 22*a* and 22*b*, thereby forming the communication area 19. The communicative areas 19*a* and 19*b* have an overlapping area 19*c* therebetween so that the communicative areas 19*a* and 19*b* are contiguous. (Similarly, the other antenna elements 23*a*, 23*b*, and 24*a*, 24*b* produce overlapping areas 20*c* and 21*c*.) The antenna units 22*a* and 22*b* output microwaves of different frequencies to perform communications as described later.

Each of the antenna elements 22*a*, 22*b*, 23*a*, 23*b*, 24*a* and 24*b* is a micro-strip type array antenna element wherein eight square patches are formed on one surface of a printed circuit board and are linked by transmission lines to a feed terminal. The printed circuit board used is made of a resin material printed with a conductor on both surfaces (i.e., a two-side printed circuit board), where the change in temperature characteristics of the dielectric constant of the resin material within the operating temperature range (e.g., high-temperature range up to approximately 120° C.) is a predetermined level or lower (e.g., 1% or lower). For example, a BT resin material or a glass epoxy material is used. The eight patches are laid out in two rows of four patches each, with respective vertexes facing each other being slightly cut out to form circular polarized waves. These patches are formed by being etched together with the transmission lines.

Although an array antenna having many patches usually generates side lobes, the antenna elements 22*a* and 22*b* in this embodiment reduce side lobes by adjusting the impedance of the transmission lines to prevent communication-disabled areas from occurring in an intermediate band. For example, each of the antenna elements 22*a* and 22*b* is designed to cover substantially the same area within the range of a height of approximately 1 to 2 meters; that is, the range of height at which an on-vehicle device 30 mounted on the vehicle 29 passes.

The vehicles 29 running on the expressway 11 are respectively equipped with the on-vehicle devices 30 mounted in the vicinity of their dashboards. Each of the on-vehicle devices 30 has an antenna 31 which receives pilot signals and interrogation signals from the antenna units 16–18 on the ground device gantry 15. The antenna 31 is also a micro-strip type antenna having two square patches formed on a printed circuit board which is the same as that used for the antenna element 22*a*. In this case, the two patches are single patches respectively provided for receiving and transmitting.

The antenna 31 has a configuration where a response signal is transmitted by reflecting while modulating an unmodulated carrier wave transmitted from the antenna unit 16 with the response signal. That is, the on-vehicle device 30 is designed to be capable of transmitting the response signal by reflecting the unmodulated carrier wave from the antenna units 16–18 within the communication areas 19–21 by the use of the response signal while receiving the unmodulated carrier wave.

The electrical structure of the first embodiment will be described with reference to FIG. 1. The antenna unit 16 will be used as a representative example of the similarly-constructed antenna units 16–18. FIG. 1 shows an overall construction, in which control section 33 as the communication control unit for controlling control circuits 32*a* and 32*b* provided respectively for the antenna elements 22*a* and 22*b* includes a control circuit 34, a power source circuit 34, and an interface circuit 35 for exchanging data with the outside.

In the control circuits 32*a* and 32*b* respectively provided for the antenna elements 22*a* and 22*b*, a modulation circuit 37 modulates a carrier wave, i.e., an oscillation output from an oscillator 38 having a predetermined frequency, with a pilot interrogation signal or an interrogation signal from the control circuit 34, and outputs the modulated signal to the antenna element 22*a* via a circulator 39.

A receiving circuit 40 for performing signal processing, such as demodulation, is connected to a mixer 41. The mixer 41 receives an oscillation output from the oscillator 38 and also receives a radio wave signal from the antenna element 22*a* via the circulator 39 corresponding to a response signal. The carrier wave and the radio wave signal corresponding to the response signal are mixed by the mixer 41 and the mixed signal is output to the receiving circuit 40. The receiving circuit 40 demodulates the received composite signal to obtain a response signal and outputs it to the control circuit 34.

Each of the oscillators 38 provided respectively for the antenna elements 22*a*–24*b* outputs the carrier wave in the form of quasi-microwaves within a predetermined frequency band, for example, in the 2.45 GHz band. Each oscillator 38 is set to output a oscillation signal of a uniform frequency by using a PLL (phase lock loop) circuit or the like to provide stable outputs to make the frequency of the oscillators consistent with each other at high precision. Such a technique is described in U.S. patent application Ser. No. 08/504,155, incorporated herein by reference.

Each of the antenna units 16–18 constructed as described above receives a timing signal driven corresponding to the respective antenna elements 22*a*–24*b* by a control unit (not shown) connected thereto via the interface circuit 36. In this case, the timings of outputting the pilot interrogation signals and interrogation signals to the communication areas 19–21 are set to be shifted by one cycle with respect to the repeat cycle (e.g., 10 ms) between the adjacent antenna units 16 and 17 and between the adjacent antenna units 17 and 18.

Accordingly, if the on-vehicle device 30 mounted on a vehicle which passes through the communication areas 19–21 passes through an area where the communication area 19 and the communication area 20 overlap with one another, for example, the on-vehicle device 30 will not simultaneously receive pilot signals from two antenna units 16 and 17 as described later.

In the on-vehicle device 30, the control circuit 42 including a CPU, a ROM and a RAM outputs various data, such as an identification code, as a response signal responsive to a pilot signal or an interrogation signal according to a pre-stored program. The control circuit 42 is connected to the antenna 31 via a transmitting circuit 43, and also via a receiving circuit 44.

The transmitting circuit 43 performs modulation processing in accordance with a response signal and modulates an unmodulated carrier wave received by the antenna 31 to transmit it as a response signal. The receiving circuit 44 demodulates a radio wave received by the antenna 31 to obtain an interrogation signal and supplies the signal to the control circuit 42, thus forming a half-duplex structure. The control circuit 42 is connected to a data memory 45 which is a read/write-non-volatile memory. A battery 46 supplies power to the circuits in the on-vehicle device 30. A timer circuit 47 as the communication control unit is constructed as a one-shot timer circuit which generates a timer interruption signal after counting a transmission-inhibited time AT described later if a start trigger is given, and outputs the timer interruption signal to the control circuit 42.

The control circuit 42 includes a starting circuit (not shown). When the control circuit 42 receives a signal from the outside, the starting circuit starts the entire device and switches it from "sleep status" to "wake-up status" to make it perform communications. When the communications are completed, the entire device is controlled to stop and return to the "sleep status", and waits to receive a signal from the outside. This construction reduces the consumption of the battery 46 when communication is not performed.

A summary of the operation when five antenna units A–E are used will be described with reference to FIGS. 4A–4E and 6 before describing the operation of this embodiment. The five antenna units A–E are set to the same oscillation frequency f1. The adjacent antenna units respectively have communication areas which overlap with one another, thus forming contiguous communicative areas over a wide range.

The antenna units A–E are divided into two groups: namely, a first group consisting of every other antenna unit A, C and E and second group consisting of every other antenna unit B and D. The antenna units of the respective groups are controlled to perform communications at the same timing within that group. During communications, transmission is performed during the transmission period (down link Dn) and reception is performed during the succeeding reception period (up link Up). During the down link Dn, pilot signals or various interrogation signals are transmitted to the communication area. During the up link up, unmodulated carrier waves are transmitted, and the antenna unit receives a response signal from the on-vehicle device in the communication area.

In this case, the response signal from the on-vehicle device is transmitted towards the antenna unit by modulating an unmodulated carrier wave transmitted from the antenna unit with a signal. The antenna unit receives the signal as a response signal.

Figure 5:
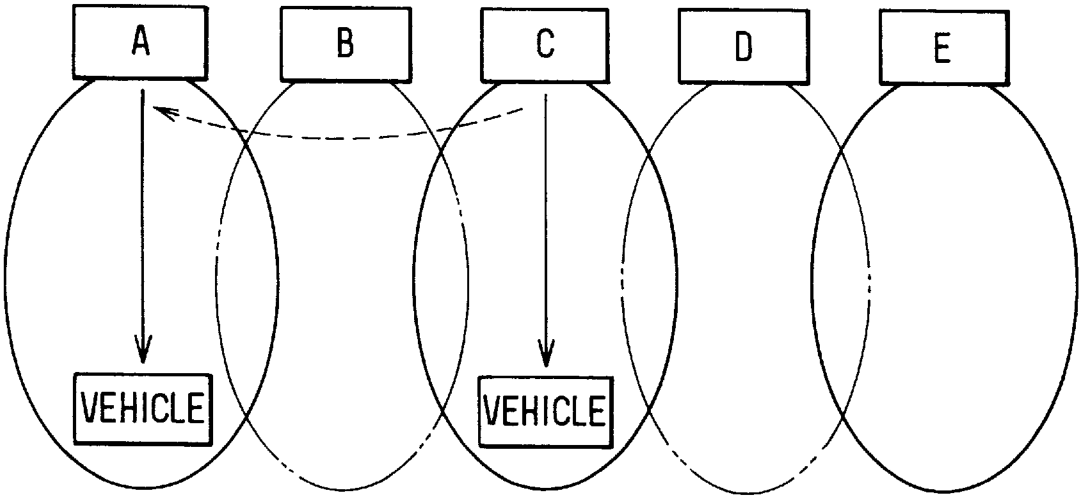
FIGS. 5 and 6 show communication areas and communication states of the antenna units in the first embodiment.
Figure 6:
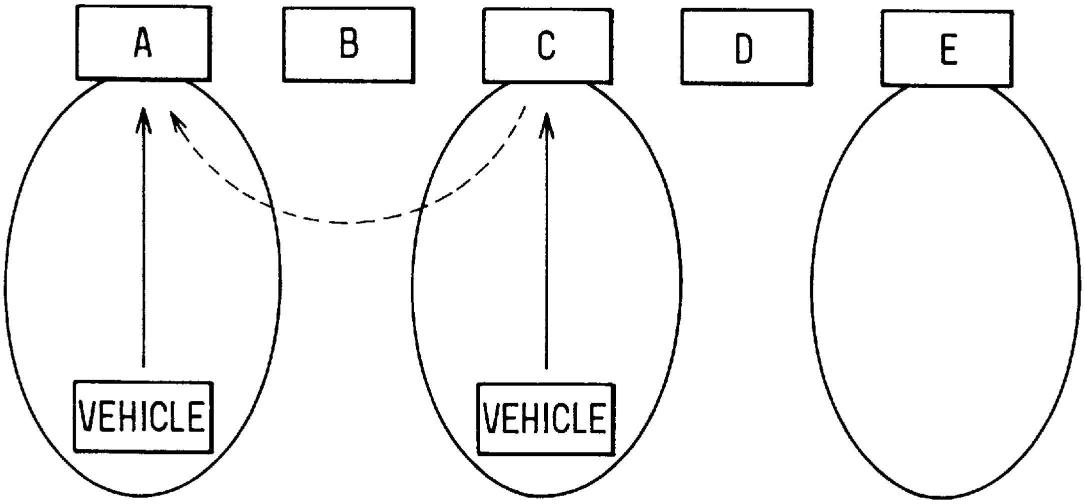
Figure 11:
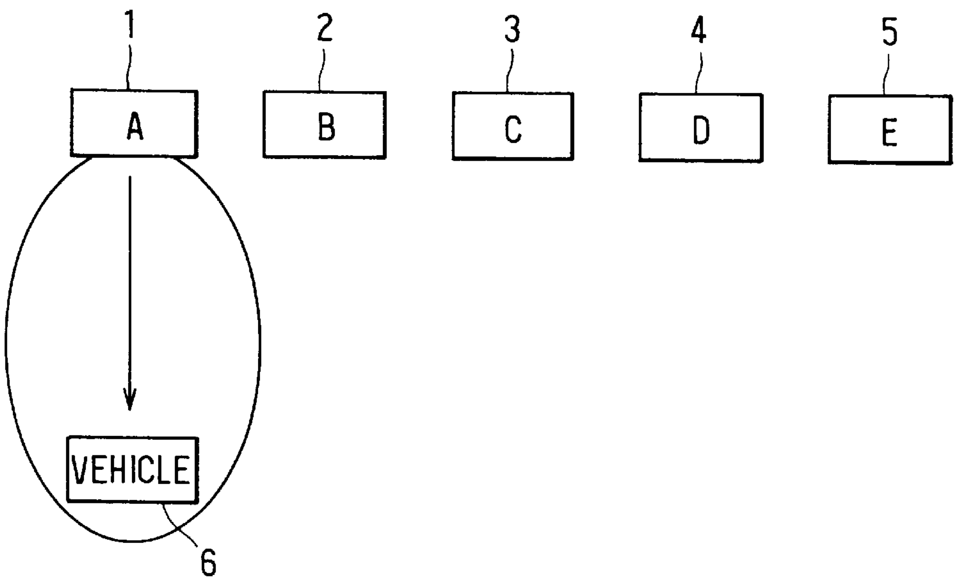
FIG. 11 PRIOR ART
FIGS. 11 and 12 show communication areas and communication states of the antenna units in the prior art system.
Figure 12:
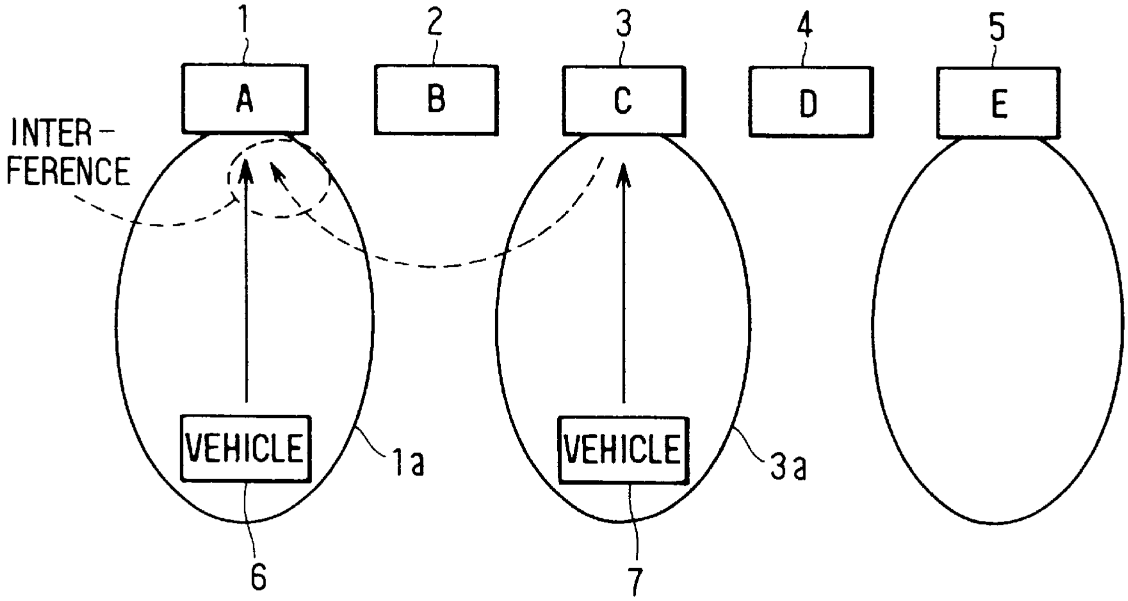
FIG. 12 PRIOR ART

In the first group of antenna units A, C and E or in the second group of antenna units B and D, whose communication areas do not overlap with each other within the group, each communication period T is set so that the antenna units within the same group have simultaneous down link periods Dn and up link periods Up. For example, during the down link period Dn in which the antenna unit A is performing the transmission, the antenna units C and E are also performing the transmission and therefore a transmission signal output from the antenna unit A is not received by the antenna units C and E (FIG. 5).

During the up link period Up in which the antenna unit A is receiving the signal, i.e., performing the reception while transmitting unmodulated carrier waves, the antenna units C and E are also in the up link period Up in which they are respectively performing the reception while transmitting unmodulated carrier waves, and therefore the antenna unit A receives a response signal from an on-vehicle device which exists in its communication area or receives unmodulated carrier waves from the antenna units C and/or E. If the antenna unit A receives unmodulated waves from the antenna units C and/or E having the same frequency at this moment, it does not cause interference therebetween because the unmodulated wave from the antenna units C and E have the same frequency as that of the antenna unit A, so the antenna unit A can receive the response signal transmitted from the on-vehicle device in its communication area.

The antenna units A–E are provided such that the adjacent antenna units having an overlapping communication area therebetween alternately perform one communication cycle (FIGS. 4A–4E). That is, when units in the first group of antenna units A, C and E respectively complete one-time communication, i.e., both a down link period Dn corresponding to the former half cycle in which transmission is performed and the latter half cycle corresponding to an up link period Up in which a reception is performed, they also stop transmitting unmodulated carrier waves. Subsequently, units in the second group of antenna units B and D respectively perform one-time communication; when the antenna units B and D respectively complete a down link period Dn in which transmission is performed and an up link period Up in which reception is performed, they also stop transmitting unmodulated carrier waves.

As a result, if the on-vehicle device exists in an area where communication areas overlap with each other, the on-vehicle device will not have a failure such as interference caused by simultaneous communications with two antenna units, thus performing communications with either antenna unit.

This method can be applied to perform communications reliably and speedily without interference while using a minimum frequency band. Such effects will be more obvious when increasing the number of antenna units to be used.

The operation of this embodiment will be described with reference to FIGS. 7A–7D as well. It is assumed that individual vehicles run on the lanes 12–14 with random time intervals between them, as is the usual case. In this case as well as in a conventional system, the antenna units 16–18 communicate with the on-vehicle devices 30 mounted on vehicles passing through the communication areas 19–21, and can reliably execute the exchange of the tolling data with the on-vehicle device 30. At this moment, the control circuit 42 in the on-vehicle device 30 is switched to the "wake-up status" by the starting circuit, and then performs the following communication processing while in the start-up status.

In a normal communication session, when the vehicle enters one of the communication areas 19–21 and the on-vehicle device 30 receives a pilot signal PLT, the control circuit 42 is switched to the start-up status to start a communication control program and determines whether a receive interruption occurs in the status. If a receive interruption occurs, the control circuit 42 executes a receive interruption program. The control circuit 42 checks the data of the received pilot signal PLT and determines whether it contains any abnormal data or not. If abnormal data is found, the control circuit 42 ends the program to return to the initial state because a correct pilot signal has not been received. If abnormal data is not found, the control circuit 42 proceeds to the next step.

The control circuit 42 determines a response waiting time Twait based on the contents of the received signal, and sets the response waiting time Twait in a interruption timer circuit 47 and then starts the circuit 47 with a starting trigger. After executing post-interruption processing, the control circuit 42 returns to the main program. The timer circuit 47 thus starts to count a timer time which is a transmission-inhibited time. When the set timer time elapses, the timer circuit 47 outputs a timer interruption signal to the output circuit 42.

The timer circuit 47 is set so that the down link period Dn, i.e., the half cycle T/2, where T is one communication cycle, is set to the timer time which is a transmission-inhibited time, e.g., 5 ms. Thus, transmission of a response signal is delayed until 5 ms elapses after a signal is received from the outside.

When the main program restarts in the control circuit 42, it analyzes the contents of the received signal and executes operations based on the contents, and then generates a response signal based on the result of the processing. The control circuit 42 only generates a response signal in this step, and therefore waits for the timing of transmitting the signal. The control circuit 42 is then in the state of permitting a timer interruption by the interruption signal from the timer circuit 47. Then, the control circuit 47 waits for a timer interruption to transmit the response signal.

If the interruption signal has been input from the timer circuit 47 or it is input therefrom, the control circuit 42 executes the timer interruption program. That is, the control circuit 42 starts transmitting the response signal in the up link period Up and then executes the post-interruption processing to return the main routine. After completing transmitting the response signal in this way, the main program starts in the control circuit 42 again.

The control circuit 42 of the on-vehicle device 30 generates and transmits a response signal every time it receives a signal from the outside as described above. In the normal state, when the control circuit 42 receives a pilot signal PLT from the antenna units 16–18, the control circuit 42 performs the communication processing as described below while repeatedly performing the above-described processes.

Once the control circuit 42 receives a pilot signal PLT1 from the antenna unit 16, for example, the control circuit 42 establishes the antenna unit 16 as a fixed communication party thereafter, and will be set to reject pilot signal PLT2 and PLT3 transmitted respectively from other antenna units 17 and 18 if it receives them. In this state, the control circuit 42 generates a pilot response signal RSP1 in response to the pilot signal PLT1 and transmits a response by reflecting while modulating unmodulated carrier waves continuously transmitted from the antenna unit 16 by the use of the generated pilot response signal RSP1. The pilot response signal RSP1 holds an identification code which has been registered as a code specific to the on-vehicle device 30.

After the above processing, the antenna unit 16 transmits an on-vehicle device data transmission request signal RC1 as an interrogation signal following the pilot signal PLT1. The on-vehicle device data transmission request signal RC1 holds a code indicating a location, a gantry code number, and an identification code registered corresponding to the on-vehicle device 30 so that only on-vehicle device 30 executes the communication processing after the reception.

Upon receiving the on-vehicle device data transmission request signal RC1, the on-vehicle device 30 reads data, such as balance amount data, to generate a card read signal RD1, and then transmits the signal to the antenna unit 16 in the same manner as described above. When the antenna unit 16 receives the read signal RD1 as an interrogation signal, it transmits specified data for processing tolling data as a write signal WD1 to the on-vehicle device 30. The write signal WD1 holds a tolling instruction code, toll amount data, a location code number, a gantry code number, an identification code of the on-vehicle device 30 and operation time data and the like. If the response signal RSP1 from the on-vehicle device 30 is abnormal, the antenna unit 16 executes a specified abnormality processing routine.

When the on-vehicle device 30 receives the write signal WD1, it reads the contents of the signal to perform a specified write operation and then transmits a write end signal END1 including a location code signal, a gantry code number and an identification signal of the on-vehicle device 30 in the same manner as described above. Upon receiving the write end signal END1, the antenna unit 16 transmits an end acknowledge signal ACK1 to the on-vehicle device 30 to inform it of the reception of the write end signal END1. Upon receiving the end acknowledge signal ACK1, the on-vehicle device 30 determines that communication has been completed, and the starting circuit stops to shift the device to the "sleep status", that is, the status before communication starts.

If the on-vehicle device 30 receives a pilot interrogation signal PLT again in the communication areas 19–21 of the same ground device 15 after it has performed the communication processing, the on-vehicle device 30 ignores the signal judging from the data on the communication results stored therein, thus avoiding interference with communications by other on-vehicle devices. This also prevents the on-vehicle device 30 from repeating communications within the same communication area 19 or within the communication areas of the same gantry 15, thus eliminating the possibility of double charging of a toll.

For actual toll charging processing, the on-vehicle device 30 is designed to be used with an IC card (not shown) mounted therein. After passing through the communication area 16, the on-vehicle device 30 is designed to write the data corresponding to the amount obtained by subtracting the toll amount data transmitted during communications from the toll balance based on various written data specified by the above-mentioned write signal WD1 in the IC card via an IC card interface.

The following will describe the case where small vehicles such as motorcycles are running side by side and the on-vehicle vehicle devices 30*a* and 30*b* mounted therein start communications respectively after receiving a pilot signal PLT1 of the antenna unit 16 and a pilot signal PLT2 of the antenna unit 17 while they are passing through an overlapping area D substantially at the same time.

For communications between the on vehicle-devices 30*a* and 30*b* and the antenna units 16 and 17, the following times are set. The communication cycle T is set to, for example, 10 ms. The communication cycles of the antenna units 16 and 17 are shifted from each other by one cycle T, i.e., 10 ms. As shown in FIG. 7A, a down link period Dn, in which pilot signals PLT, interrogation signals RC or the like are transmitted, is set to a time period 5 ms that begins with the beginning of the communication cycle T. An up link period Up, in which the on-vehicle device 30*a* transmits response signals, is set to a time period 5 ms that begins at 5 ms and ends at 10 ms following the down link period Dn.

Among the above-described periods, transmission of the response signal during the up link period Up is set within the on-vehicle devices 30*a* and 30*b*. That is, a start trigger is output to the timer circuit 47 to start the timer operation when a pilot signal or an interrogation signal is received, and the response signal is transmitted when a timer interruption signal is input when the response waiting time Twait elapses.

When the on-vehicle devices 30*a* and 30*b* perform communications respectively with the antenna units 16 and 17 in the overlapping area D, the timings of transmitting the response signals from the two devices may overlap with each other. If the overlapping of the response signals occurs in the overlapping area D in this way, the antenna units 16 and 17 each receive both response signals, thus causing interference. This embodiment avoids such an event by setting a response waiting time Twait using the timer circuit 47.

As shown in Case 1 in FIG. 7B, if the transmission time TQ of an interrogation signal is 4 ms and the processing time TS of the interrogation signal is 1 ms, for example, the timing of transmitting the response signal corresponds to a 5 ms to 10 ms period which is in the up link period Up. As shown in the case 2 in FIG. 7C, if the transmission time TQ of an interrogation signal is 5 ms and the processing time TS is 2 ms, the timing of transmitting a response signal corresponds to a 7 ms to 10 ms period which is also in the up link period Up, so that interference will not be caused if the response signal is transmitted.

As shown in Case 3 in FIG. 7D, however, if the transmission time TQ of an interrogation signal is 2 ms and the processing time TS is 1 ms, the timing of transmitting the response signal comes after 3 ms or later, i.e., in the down link period Dn before an elapse of 5 ms. In this case, the transmission of the response signal is delayed until the response waiting time Twait, i.e., 5 ms, set to the timer circuit 47 elapses. As a result, when signals are exchanged, an overlapping time of the response signals respectively transmitted from the on-vehicle devices 30*a* and 30*b* is eliminated, and the transmission time TQ of an interrogation signal, the processing time TS of an interrogation signal and the transmission time TA of a response signal vary according to the changes in situations. Therefore, the on-vehicle devices 30*a* and 30*b* can respectively communicate with the antenna units 16 and 17 without interference therebetween.

This embodiment has a construction wherein the same oscillation frequency is set to all antenna units 16–18, and the antenna units 16 and 18 simultaneously perform communications and the antenna unit 17 performs communication after the antenna units 16 and 18 complete one communication cycle so that a pair of the antenna units 16 and 18 and the antenna unit 17 execute communications alternately with each other. That is, the antenna units 16 and 18 are set to the same down link period Dn and up link period Up to perform transmission and reception. Therefore, this prevents interference between the antenna units 16 and 18 and makes it possible for the antenna units whose communication areas overlap with each other to communicate with the on-vehicle device reliably. Furthermore, speedy and reliable communication processing can be performed because there is no limit to the communication time depending on the number of antenna units, such as in the time-division multiplex method.

Additionally in this construction, the timer circuit 47 is in the on-vehicle device 30 mounted on a vehicle to perform control so that the timing of transmitting a response signal comes after an elapse of a specified time and the control circuit 47 transmits the response signal after receiving a timer interruption signal from the timer circuit 47. Therefore, when small vehicles such as motorcycles are running side by side and communicate with the antenna units 16 and 17 respectively while the on-vehicle devices 30*a* and 30*b* mounted therein pass through the overlapping area D, overlapping transmission of the response signals is avoided and therefore the communication interference can be prevented to the utmost. Thus, the communication processing and the tolling operation can be reliably performed.

In the first embodiment as mentioned above, the timer circuit 47 is in the on-vehicle device 30 to adjust the communication time to prevent interference; however, instead of using the timer circuit 47, the antenna units 16–18 can have the same functions as the timer circuit 47. That is, when it is estimated that the on-vehicle device 30 transmits a response signal at a timing earlier than 5 ms in response to a pilot signal or an interrogation signal transmitted from the antenna units 16–18, the control circuit 34 transmits the pilot signal or the interrogation signal with a dummy signal, which does not directly relate to communication, as a preamble so that the timing of transmitting the response signal from the on-vehicle device 30 comes after 5 ms during the up link period up.

This construction eliminates the need for taking measures to prevent interference for on-vehicle devices 30 to be mounted on vehicles by providing the control circuit 34 of each of the antenna units 16–18 with the function of attaching a preamble to a pilot signal or an interrogation signal if necessary, thus preventing interference if the same situation as in the first embodiment occurs.

Further in this construction, instead of attaching a preamble to a pilot signal or an interrogation signal, the control circuit 34 of each of the antenna units 16–18 can be designed to set a delay time Td corresponding to the time of the preamble to delay transmission.

A second embodiment of the present invention is shown in FIGS. 8A–8E and 9. According to this embodiment, as shown in FIG. 9, the operating frequencies of the antenna elements 22*a* and 22*b* of the antenna units 16 and 18 are set to the same frequency f1, and the operating frequency of the antenna elements 22*a* and 22*b* of the antenna unit 17 is set to a frequency f2 which is different from f1; that is, each communication cycle of antenna units 16–18 is set to be shifted by half a cycle between the adjacent antenna units. This embodiment has a construction wherein the on-vehicle device can perform communications at either frequency f1 or f2 which is set to the antenna units 16–18.

The principle of this embodiment will be described for the case where five antenna units A–E are used as well as described with reference to FIGS. 4A–4E in the first embodiment. The first group of the antenna units A, C and E is set to have the frequency f1, and the second group of the antenna units B and D is set to have the frequency f2. The second group of the antenna units B and D starts the communication period T after the first group of antenna units A, C and E ends the down link period Dn which is set to the first half cycle of the communication period T (FIG. 8). The down link period Dn overlaps with the up link period Up of the first group of the antenna units A, C and E.

Accordingly, it takes 1.5T as one cycle for all antenna units A–E to complete the communication T. The time is further reduced compared with the one cycle 2T in the first embodiment, thereby increasing the frequency of communication occurrence.

In the above construction, when the on-vehicle device performs communications in an area where communication areas of two antenna units overlap with each other, since the communication cycles T are shifted from each other by half a cycle, the on-vehicle device first receives an interrogation signal transmitted from the antenna unit which is in the down link period Dn of the communication cycle T and starts communicating with the antenna unit.

In this case, the oscillation frequency of the two antenna units are set differently from each other. Once the on-vehicle device starts communicating with either antenna unit, therefore, it transmits a response signal in response to a carrier wave of the frequency transmitted from the antenna unit and can continue the communication processing without interference.

Although the present invention has been fully described in connection with the preferred embodiments thereof with reference to the accompanying drawings, it is to be noted that various changes and modifications will become apparent to those skilled in the art. For example, instead of providing the timer circuit 47, the control circuit 42 may implement a timer function using software. In this construction, however, the CPU cannot execute other processing while executing the timer function, so that the timer time must be counted taking into consideration the processing time of interrogation signals.

When a preamble as a dummy signal is attached to a pilot signal or an interrogation signal, it is possible to attach a dummy signal for adjusting time unrelated to the contents of communication or attach other data needed for communication as a dummy signal.

Besides expressways, the present invention can be applied to toll charging operations in pay parking lots. In this case, vehicles can simultaneously enter from multiple lanes, and there is no need for the vehicles to stop at the entrance/exit to perform toll charging procedures, thereby enabling speedy entrance and exit to and from the parking lot and reducing labor necessary for toll charging.

In addition to toll charging operations, the present invention can be applied to the exchange of various data for research on traffic and the like. For example, the invention can be applied to research on traffic volume and the preparation of traffic information, to city traffic planning and the like.

The number of traffic lanes is not limited to three, but may be two, four or more. Further, the on-vehicle device is not limited to a structure which wakes up upon receiving pilot interrogation signals, but may always be in operation. Also, the antenna element may use means other than patches.

Finally, preferred embodiments of the invention have been described in connection with a passive communication method; that is, one in which the on-vehicles do not generate any radio signals themselves but merely modulate signals from the antenna units while reflecting them; however, the invention may also be applied to an active system in which the signals from the on-vehicle units are generated therein and do not depend on reflection of signals from the antenna units.

Such changes and modifications are to be understood as being included within the scope of the present invention as defined by the appended claims.

What is claimed is:

1. A vehicle communication system comprising:

a plurality of antenna units each having a respective communication area, a group of said antenna units being set to the same frequency, transmitting interrogation signals in a common cycle to communicate with on-vehicle devices mounted on vehicles in said communication areas, and receiving response signals from said on-vehicle devices responsive thereto; and communication control means for controlling at least two of said antenna units, set to the same frequency, whose communication areas do not overlap with each other, to perform communication so that reception of signals from said on-vehicle devices are performed in a common period, said at least two antenna units being immediately adjacent to one another to perform communications so that communication periods of the at least two antenna units, consisting of transmissions and subsequent receptions, do not overlap with one another.

2. The system of claim 1, wherein communication areas of the at least two adjacent antenna units overlap with each other.

3. The system of claim 1, wherein said on-vehicle device is for transmitting a response signal in response to said interrogation signal after an elapse of said transmission period.

4. The system of claim 1, wherein said communication control means is for setting the interrogation signal so that the timing of transmitting a response signal from said on-vehicle device in response to said interrogation signal comes after an elapse of said transmission period.

5. The system of claim 1, wherein each antenna unit is for receiving a signal generated by said antenna unit and modulated and reflected by an on-vehicle device as said response signal.

6. The system of claim 1, wherein said communication control means is for controlling said antenna units set to the same frequency whose communication areas do not overlap with one another so that transmission of signals to said vehicular devices are performed in a common period.

7. The system of claim 1, wherein said communication control means is for controlling the antenna units to transmit a dummy signal, to which said on-vehicle devices do not respond, as a preamble of said interrogation signals.

* * * * *